United States Patent
Vélez et al.

(10) Patent No.: US 7,043,450 B2
(45) Date of Patent: May 9, 2006

(54) PAID SEARCH ENGINE BID MANAGEMENT

(75) Inventors: Juan C. Vélez, Los Angeles, CA (US); Daren Murrer, Hamilton, OH (US)

(73) Assignee: Paid Search Engine Tools, LLC, Cincinnati, OH (US)

( * ) Notice: Subject to any disclaimer, the term of this patent is extended or adjusted under 35 U.S.C. 154(b) by 213 days.

(21) Appl. No.: 10/324,802

(22) Filed: Dec. 20, 2002

(65) Prior Publication Data

US 2003/0088525 A1    May 8, 2003

Related U.S. Application Data

(63) Continuation of application No. PCT/US01/41263, filed on Jul. 5, 2001, which is a continuation of application No. 60/215,976, filed on Jul. 5, 2000.

(51) Int. Cl.
*G06F 17/60* (2006.01)
(52) U.S. Cl. .............................. 705/37; 707/2
(58) Field of Classification Search .................. 705/37
See application file for complete search history.

(56) References Cited

U.S. PATENT DOCUMENTS

| | | | |
|---|---|---|---|
| 5,752,238 A | 5/1998 | Dedrick | 705/14 |
| 5,794,210 A * | 8/1998 | Goldhaber et al. | 705/14 |
| 5,852,820 A * | 12/1998 | Burrows | 707/2 |
| 5,974,398 A * | 10/1999 | Hanson et al. | 705/14 |
| 5,983,205 A | 11/1999 | Brams et al. | 705/37 |
| 6,021,398 A | 2/2000 | Ausubel | 705/37 |
| 6,078,866 A * | 6/2000 | Buck et al. | 702/2 |
| 6,243,691 B1 * | 6/2001 | Fisher et al. | 705/37 |
| 6,269,361 B1 | 7/2001 | Davis et al. | 707/3 |
| 6,272,473 B1 | 8/2001 | Sandholm | 705/37 |
| 6,421,675 B1 * | 7/2002 | Ryan et al. | 707/100 |

(Continued)

FOREIGN PATENT DOCUMENTS

DE    199 13 509 A 1    * 9/1999

(Continued)

OTHER PUBLICATIONS

Taylor C P, Engines of Growth, Brandweek v45n11, Mar. 15, 2004, pp. 26-28+.*

(Continued)

*Primary Examiner*—Charles Kyle
(74) *Attorney, Agent, or Firm*—Wood, Herron & Evans, LLP

(57) ABSTRACT

A method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

22 Claims, 3 Drawing Sheets

U.S. PATENT DOCUMENTS

| | | | |
|---|---|---|---|
| 6,826,572 B1 * | 11/2004 | Colace et al. | 707/10 |
| 2001/0051911 A1 * | 12/2001 | Marks et al. | 705/37 |
| 2002/0099605 A1 * | 7/2002 | Weitzman et al. | 705/14 |
| 2002/0169760 A1 * | 11/2002 | Cheung et al. | 707/3 |
| 2004/0088241 A1 * | 5/2004 | Rebane et al. | 705/37 |
| 2005/0144065 A1 * | 6/2005 | Calabria et al. | 705/14 |
| 2005/0240580 A1 * | 10/2005 | Zamir et al. | 707/4 |
| 2005/0256766 A1 * | 11/2005 | Garcia et al. | 705/14 |
| 2006/0010105 A1 * | 1/2006 | Sarukkai et al. | 707/3 |

FOREIGN PATENT DOCUMENTS

| | | | |
|---|---|---|---|
| GB | 2 331 166 A | * | 12/1999 |

OTHER PUBLICATIONS

Howard B, Optimize Search Results Now, Target Marketing v27n2 Feb. 2004, pp. 81-83+.*

BeFirst.com Announces Plans to Launch New Internet Searh Engine- To Be Called FindWhat.com Business Wire Jun. 28, 1999 2 pgs.*

McKenzie, Matt, *Web Services go searching for dollars; Will consumers accept pay-to-play search engines?*, Seybold Report on Internet Publishing, vol. 2, No. 7, p. 22, Jul. 1998.

* cited by examiner

FIG. 4

PAID SEARCH ENGINE BID MANAGEMENT

CROSS REFERENCE TO RELATED APPLICATIONS

This application is a continuation of PCT application Ser. no. US01/41263, filed Jul. 5, 2001, which is a United States continuation of U.S. Provisional Patent Application Ser. No. 60/215,976, filed Jul. 5, 2000, and entitled "PAID SEARCH ENGINE BID MANAGEMENT", which is incorporated by reference herein in its entirety.

FIELD OF THE INVENTION

The present invention relates to the management of advertising expenses in online media.

BACKGROUND OF THE INVENTION

Use of the Internet has expanded at a nearly geometric rate in the most recent few years, both in the number of users online and the number of sites and associated content that content providers have made available online. The increases in both categories have enhanced the importance of so-called "portal" sites, such as large Internet access providers and popular Internet search engines. Statistics indicate that an overwhelming majority of traffic to Internet sites passes through such portal sites.

Until recently, Internet search engines have indexed available Internet sites by a process of search and selection. Professionals employed by the search engine sponsor identify and index Internet sites of potential interest to users. In some cases, this process would be embellished by "spidering" identified sites, i.e., traversing links within the site to accumulate word indexes for all reachable pages at the site. Content providers could participate in this process by submitting links to their site to the search engine, but other than through such submissions, could not influence whether these links would be added to the search engine.

Recently, a new model for a paid Internet search engine has been introduced, best exemplified by the site GoTo.com. In a paid Internet search engine, content providers submit bids for each one or more keywords they desire to associate with their site. The paid search engine will respond to a user's request for sites with one or more keywords, by producing a list of links to those sites that have submitted bids on those keywords. The order in which links are identified is determined by the bid amounts provided by the sites—the site with the largest (cumulative) bid(s) for the keywords(s) identified by the user, appears first in the list of sites presented to the user, followed by the site with the second largest (cumulative) bid(s) and so on.

Content providers are invoiced the bid amount each time a link to the provider's site is used by a user to access that site.

As paid search engines become increasingly popular, the rate of change of bid amounts at those sites has increased, a consequence of competition for desirable keywords and relative positions in those keywords. To foster competition, paid search engines have provided facilities for bidders to monitor certain statistics, such as a daily count of "hits" on particular keywords, and reports of current bids on a given single keyword. However, paid search engines have not, to date, made such competitive information readily accessible. For example, a bidder can only view current bid positions of one keyword at a time, and has no mechanism for quickly identifying large gaps in bid amounts indicative of an opportunity for bid optimization. For a content provider managing tens or hundreds of keyword bids, the burden of evaluating each keyword individually can be substantial. The apparent reason for this situation is that paid search engines do not wish to incur the lost revenue that would result were the content providers able to fully optimize their bidding strategies, e.g., by quickly determining whether any current bids for keywords of interests can be lowered, without any or any important change in ranking relative to other bidders. A non-optimal bid on any given keyword, meaning any bid with a difference of greater than one cent from the next lower bid, represents consumer surplus captured by the paid search engine, which the search engine sponsor does not wish to relinquish.

To date, few services have been introduced to aid in bidding on paid search engine keywords. One such service accumulates generic statistics on the bid ranges for particular positions (e.g., 6, 12, etc.) for particular keywords at a paid search engine. This data is useful in selecting keywords on which to bid, but does not provide any assistance in managing bids that have been placed to ensure those bids are optimized and that a desired position has been maintained as competitors change their bids for the selected keywords.

SUMMARY OF THE INVENTION

The present invention provides a method and apparatus (information processing system) for overcoming these deficiencies and inefficiencies in the current paid search engine keyword bidding market. Specifically, the present invention provides keyword bidders with information they need to better optimize their use of paid search engines.

In accordance with a first aspect, the invention features accumulating bid amounts for a plurality of target keywords at one or more paid Internet search engines, and presenting the bid amounts to a user.

In specific embodiments of this aspect, bid amounts for either a single paid Internet search engine, or multiple paid Internet search engines, may be accumulated and presented. The bids accumulated may be, e.g., the 20 largest bids for each target keyword. Other information accumulated and/or presented may include a statistic or the rate of use of a target keyword by users of a paid search engine, demographics of users of a target keyword, demographics or commercial information regarding bidders for a target keyword, identification of additional keywords used in conjunction with the target keywords of users of a paid Internet search engine, and identification of additional keywords so bid upon by bidders for a target keyword.

In accordance with a second aspect, the invention features presenting bid amounts for a keyword at one or more paid Internet search engines, in a manner highlighting one or more selected bid amounts of interest to a potential bidder.

In specific embodiments of this aspect, the highlighted bid amount is a bid submitted by an identified entity, e.g., the entity to which said bid amounts are presented. Alternatively, or in addition, the highlighted bid amount(s) may be associated with a differential in bid amounts meeting certain criteria. These criteria may include identifying differentials in bid amounts characteristic of an opportunity for bid optimization, such as differentials between bids larger than a minimum currency amount. These criteria may alternatively include identifying differentials between bids of the entity to whom the presentation is made, and bids of other parties.

In accordance with a third aspect, the present invention features monitoring keyword bids at one or more paid Internet search engines to identify bid changes of interest to a potential bidder.

In specific embodiments of this aspect, the identified changes are those which create a differential in bid amounts meeting certain criteria. These criteria may include identifying differentials in bid amounts characteristic of bid optimization opportunities, such as differentials between bids larger than a minimum currency amount. These criteria may alternatively include identifying differentials between bids of the entity to whom the presentation is made, and bids of other parties.

The above and other objects and advantages of the present invention shall be made apparent from the accompanying drawings and the description thereof.

BRIEF DESCRIPTION OF THE DRAWINGS

FIG. 4 is an illustration of a keyword bid report.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
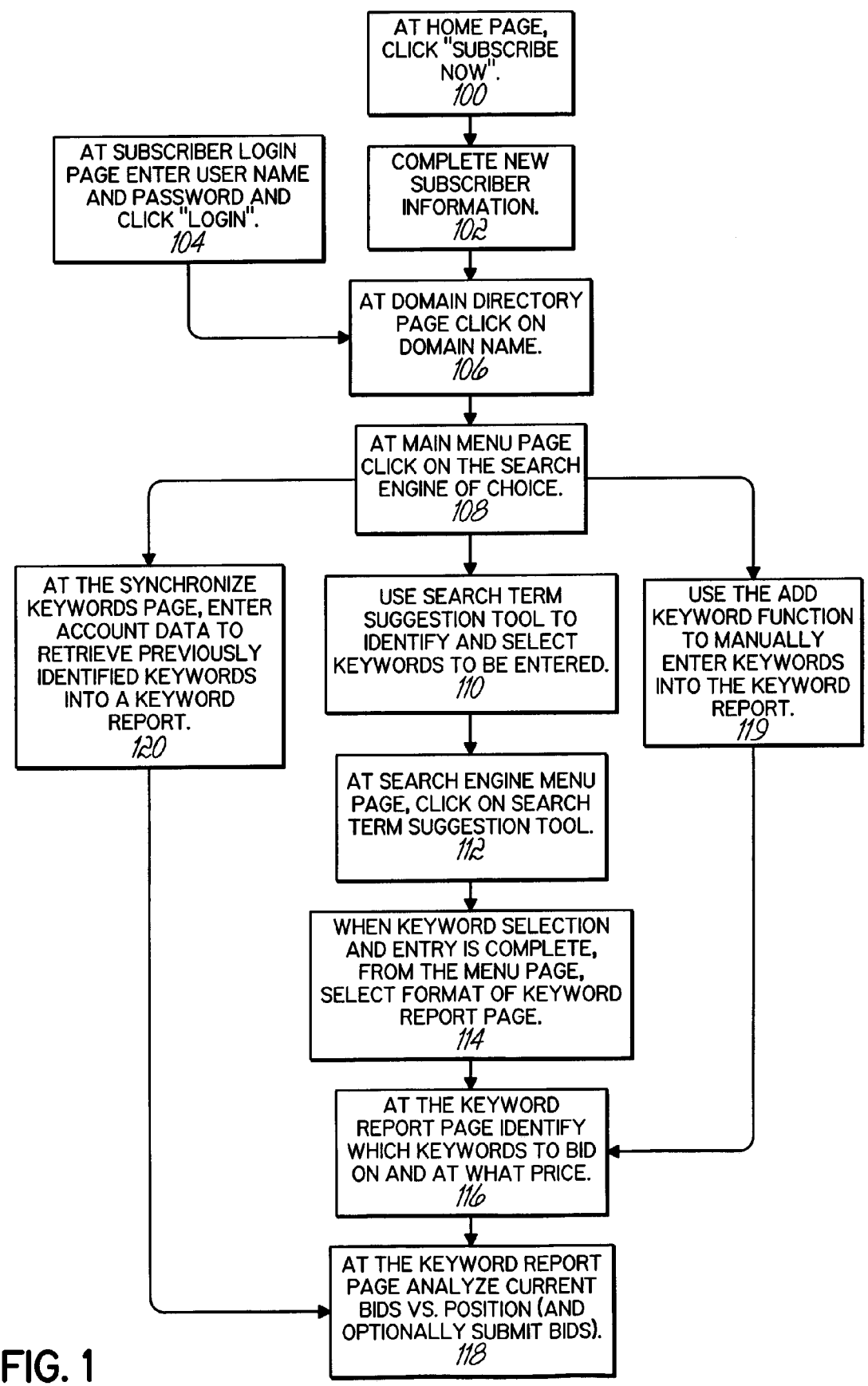
FIG. 1 is a flow chart illustrating a process for accumulating account and keyword information from a bidder to be used in keyword bid management.

The following provides an exemplary description of an implementation of principles of the present invention. Referring to FIG. 1, a process for subscribing a bidder for the use of keyword bid optimization services can be described. It is anticipated that keyword bid optimization services will be provided through an Internet site either affiliated with or separate from a paid search engine or a plurality of paid search engines. Thus, the subscription process begins in step 100 at which a bidder uses a home page of a keyword bid optimization services website and requests to subscribe, e.g., by clicking on a "subscribe now" hyperlink. In a subsequent step 102, the subscriber provides subscriber information. The subscriber information may be limited the subscriber's name, address, telephone number and email contact information, or maybe more extensive, such as including credit card information, or banking information such as bank accounts, that can be used for automatic entry in management of keyword bids as discussed below. Furthermore, a subscriber's information may include information on the subscriber's business, area of commerce, product line or other information useful in evaluating potential keywords of interest to that subscriber.

A subscriber to the keyword bid optimization service may manage keywords bids for one or a number of Internet domain names to which that subscriber wishes to direct internet traffic from a paid search engine. The new subscriber information provided by the subscriber, therefore, includes the one or several domain names to which the subscriber wishes to direct internet traffic. These domain names are then used by the system to obtain reports of keyword bids and positions for those domain names.

A final part of the new subscriber information received in step 102 is a user name and password that may be used by the subscriber to access the keyword bid optimization service and manage the bidding of keywords through the service. After a subscriber has enrolled, the subscriber may return as seen in step 104 to log into the service and thereby be associated with the previously stored subscriber information collected in step 102, including the subscriber's keywords and domain names as well as other information previously collected. After a subscriber has completed subscription to the service in step 102, or when a subscriber returns and logs into the service, the subscriber is delivered to a domain directory page in step 106. In the domain directory page, the subscriber is presented with a list of domain names that have been entered by the subscriber. The subscriber can manage keyword bids for each domain name. In the domain directory page, a subscriber selects from among the domains being managed by the subscriber and clicks on that domain name to be delivered to a main menu page of options for managing keyword bids for the selected domain name.

In the main menu page at step 108, the subscriber has a number of options to utilize the keyword bid optimization service. A first option is to use a search word suggestion tool (step 110) to select and/or identify keywords at a particular paid search engine, that are of interest to the subscriber. This process begins at a search engine selection page (step 112), at which a subscriber can select a search engine at which to submit a bid, and then activate a search term suggestion tool. At the search term suggestion tool page (step 114), the subscriber may provide keywords or search terms for keywords which are submitted to the selected paid search engine, to identify the current bids for the keyword or keywords matching the provided keywords or search terms, such as for example the twenty highest bids for the keywords. In addition, other summary information on the keywords may be provided, such as the number of times the keyword was searched by paid search engine user in a recent period, the subscriber's position and/or the position of competitors of the subscriber who have been identified by the subscriber in their subscriber information. Demographic information on users of the paid search engine who have searched using that keyword may also be provided. The summary information may also identify related keywords, i.e., keywords that users of the paid search engine have used in conjunction with the identified keyword.

Figure 4:
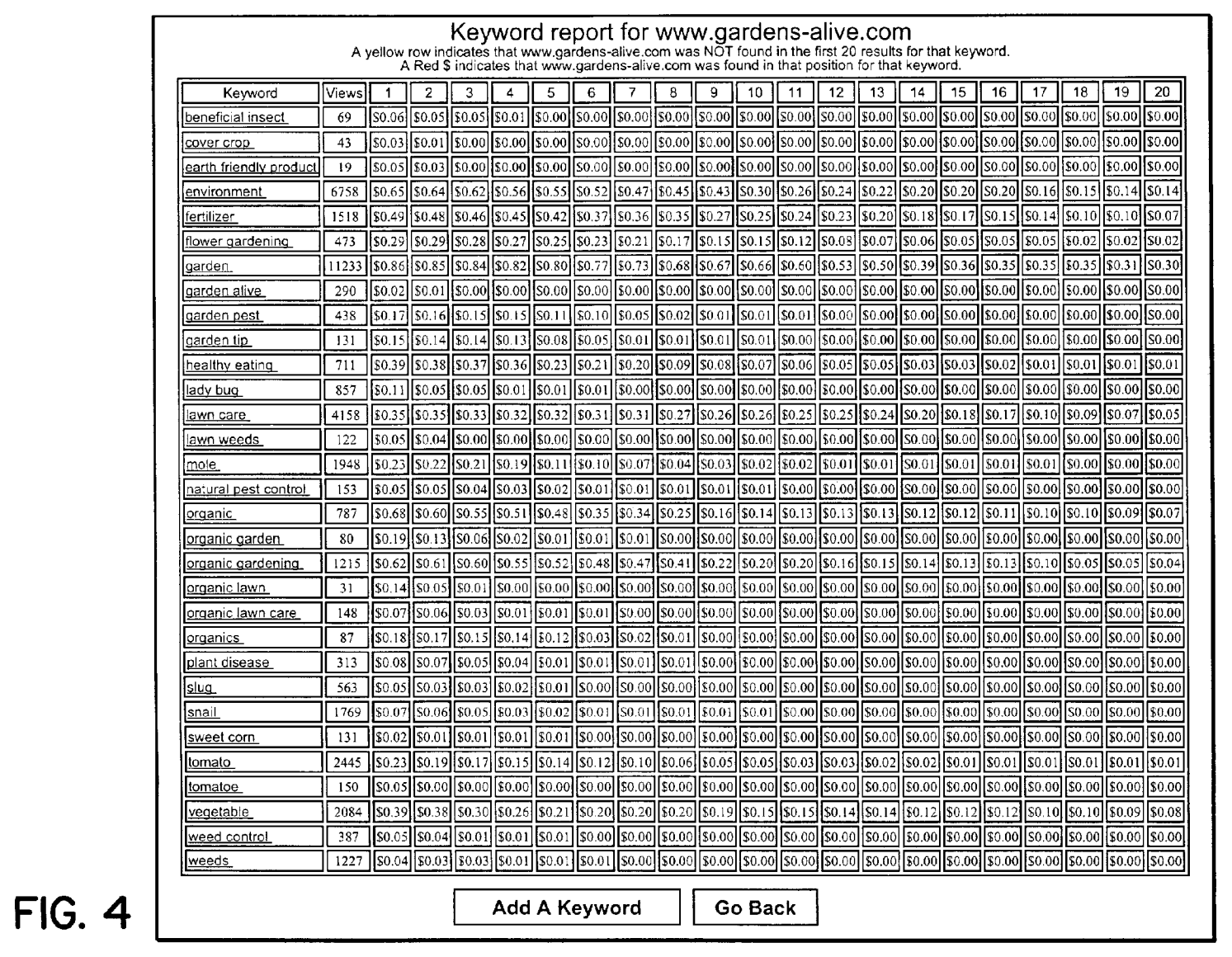

The information that is collected is stored and presented to the subscriber in an organized format. In step 114, a format of the report is selected. One example of such a format is shown in FIG. 4, and is a table of keywords identified by a subscriber and provides, for each keyword, information on the number of times that keyword has been accessed, and the first twenty bids for that keyword in a paid search engine. Selection of the format may involve, for example, selecting a number of keywords (e.g., up to 100) that are to be viewed in a table such as that shown in FIG. 4.

From a keyword report created in step 116, a subscriber may select a keyword for which to submit a bid, may delete bids, or change bids. Multiple bids may be submitted for one or more keywords, and/or existing bids may be revised to optimize those bids based on current market conditions as reported in the keyword report. In each case, the step of submitting and/or changing bids is represented by step 118 in FIG. 1.

To create, change or delete bids as represented by step 118, subscribers may select keywords and then proceed, e.g., through a separate browser window, to the paid search engine to submit their bid directly to the paid search engine. Alternatively, the keyword bid optimizing server may submit bids on behalf of the subscriber.

Bids may also be reviewed after their submission as also represented in step 118. For example, a keyword report may be produced after the submission of bid to view the current keyword positions for the subscriber and potentially also for competitors of the subscriber. The bid of the subscriber and/or competitors and/or bids that are separated by a gap suggesting possible optimization may be highlighted in the report of FIG. 4 to facilitate use of that report by the subscriber.

The process described above utilizes a search term suggestion tool to select a paid search engine and keywords for bidding. The subscriber may also manually select keywords for bidding in step 119, and similarly proceed to view a keyword bid report in step 116, and then proceed to submit, delete or change bids in step 118 as described above.

Alternatively, in step 120, the subscriber may retrieve previously identified keywords associated with the subscriber's account, and automatically produce a keyword report on those keywords. Thereafter in step 118, again the keyword report may be analyzed to determine the current bids, positions of those bids and other information of interest, and bids may be added, deleted or changed.

Figure 2:
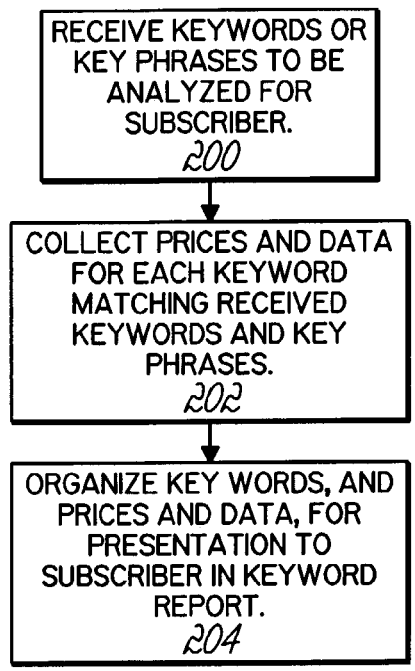
FIG. 2 is a flow chart illustrating a process for generation of a keyword report.

Referring to FIG. 2, the process for creating a keyword bid report can be further explained. In a first step 200, keywords or key phrases that are to be analyzed for a subscriber are received by the system through one of the various processes described above. Then in step 202, prices and other data for each keyword are collected as explained above. Finally, in step 204, those keywords are and those prices and any other data such as optimization opportunities are presented in a report to the subscriber.

Figure 3:
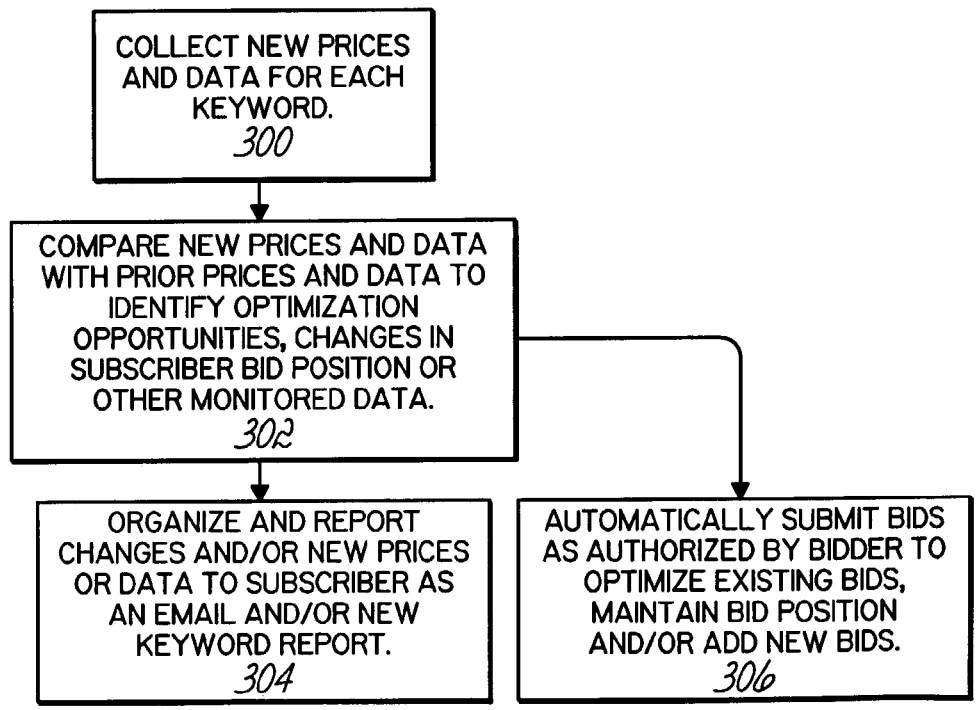
FIG. 3 is a flow chart illustrating a process for keyword bid monitoring for keywords of interest.

Referring now to FIG. 3, the process of monitoring keyword bids for a subscriber can be explained. In a first step 300, prices and other data are collected for each keyword of a subscriber that has been previously identified by the subscriber. This process may proceed in a manner that minimizes burdens on the paid search engine, such as by obtaining these items of data overnight while the paid search engine is not heavily occupied. In a subsequent step 302, the new prices or data obtained in step 300 are compared to previously identified prices and data to identify new opportunities for optimization, changes in keyword bid position, or other monitored data such as an increase or decrease in the use of the keyword by users of the paid search engine. The changes that have been identified in step 302 are then communicated to the subscriber. In one example, in step 304 the information collected in step 302 is organized and reported to the subscriber in an electronic mail message, which may be simply a report of bid positions and prices for each of the keywords of the subscriber, or may have more detailed information up to and including a complete keyword bid report of the format shown in FIG. 4 or of any other format. Alternatively, if authorization has been obtained from the subscriber, the keyword bid optimizing service may automatically submit new bids on behalf of the subscriber to the paid search engine. For example, bid prices may be increased or lowered, as needed to meet the subscriber's pre-identified requirements. Bids may be increased in order to recapture the bidder position desired by the subscriber. Bids may be decreased whenever a gap of greater than the minimum bid difference exists between the subscriber's bid and the next lower bid. Automatic optimization of bids in this manner frees the subscriber of the burden of resubmitting bids with each new optimization opportunity. It will be noted that the automatic submission of new bids in step 306 and the reporting of changes in step 304 may be combined so that bid changes are made and reported to a subscriber with whatever frequency is desired.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method of managing offers for a keyword made to a search engine, said offers identifying an amount an offeror will pay upon a searcher's use of an offeror-supplied reference located using the keyword within said search engine, comprising accumulating adjacently-ranked authorized payment amounts for a plurality of target keywords, each target keyword comprising one or more words, each authorized payment amount representing an offeror's authorized payment for one of said keywords at one or more Internet search engines, and presenting the adjacently-ranked authorized payment amounts for a plurality of target keywords on a single display screen to a user.

2. The method of claim 1, wherein said accumulating step comprises accumulating authorized payment amounts for multiple Internet search engines.

3. The method of claim 1 wherein said accumulating step comprises accumulating the three largest authorized payment amounts for each target keyword.

4. The method of claim 1 wherein said accumulating step further comprises accumulating statistic data that relates to or affects the exposure of offeror-supplied references to searchers of a search engine, statistic data being gathered on one or more of:

the rate of use of a target keyword by searchers of a search engine, demographics of searchers of a target keyword, demographics or commercial information regarding offerors for a target keyword, identification of additional keywords used in conjunction with the target keywords by searchers of a Internet search engine, and identification of additional keywords offered upon by offerors for a target keyword.

5. A method of managing offers for a keyword made to a search engine, said offers identifying an amount an offeror will pay upon a searcher's use of an offeror-supplied reference located using the keyword within said search engine, comprising presenting adjacently-ranked authorized payment amounts for a plurality of target keywords at one or more Internet search engines on a single display screen, each keyword comprising one or more words, in a manner that distinctively identifies one or more selected authorized payments of interest.

6. The method of claim 5, wherein the one or more distinctively identified authorized payment amounts are those submitted by an identified entity.

7. The method of claim 6 wherein the identified entity is an entity to which said authorized payment amounts are presented.

8. The method of claim 5 wherein the one or more distinctively identified authorized payment amounts are associated with a differential in authorized payment amounts meeting certain criteria.

9. The method of claim 8 wherein the criteria identify differentials in authorized payment amounts characteristic of an opportunity for optimization by reduction of the amount of an offer.

10. The method of claim 9 wherein said differentials are larger than a minimum currency amount.

11. The method of claim 8 wherein the criteria identify differentials between authorized payment amounts of the entity to whom the presentation is made, and authorized payment amounts of other parties.

12. A method of managing an offeror's offer for a keyword made to a search engine, said offer identifying an amount said offeror will pay upon a searcher's use of an offeror-supplied reference located upon the keyword within said search engine, comprising
  receiving an authorization from said offeror,
  after receipt of said authorization, monitoring keyword offers at one or more Internet search engines to identify a change in said offeror's offer of interest to said offeror, and
  implementing said change in said offeror's offer on behalf of said offeror based upon the previously received authorization without further intervention of said offeror.

13. The method of claim 12 wherein the identified change creates a differential in offers meeting certain criteria.

14. The method of claim 13 wherein said criteria identify differentials in offers characteristic of optimization opportunities.

15. The method of claim 14 wherein the criteria identify differentials between offers larger than a minimum currency amount.

16. The method of claim 13 wherein the criteria identify differentials between an offer of the offeror and offers of other parties.

17. The method of claim 12 wherein the change comprises increasing an offer to obtain a rank position.

18. The method of claim 12 wherein the change comprises decreasing an offer to reduce a gap between the offeror's offer and a lower offer.

19. The method of claim 12 wherein the change is identified as a result of an increase or decrease in the use of a keyword by searchers of the search engine.

20. The method of claim 12 wherein the change is identified as a result of a change in an offer of another party.

21. The method of claim 5 wherein an authorized payment amount is distinctively identified by one or more of highlighting, a different text style, a different format and different color.

22. The method of claim 12 wherein said change is generated in response to offered prices and other data.

* * * * *

UNITED STATES PATENT AND TRADEMARK OFFICE
CERTIFICATE OF CORRECTION

PATENT NO. : 7,043,450 B2
APPLICATION NO. : 10/324802
DATED : May 9, 2006
INVENTOR(S) : Velez et al.

Page 1 of 1

It is certified that error appears in the above-identified patent and that said Letters Patent is hereby corrected as shown below:

Page 2, OTHER PUBLICATIONS
Line 3, delete "Internet Searh", insert --Internet Search--.

Column 3
Line 51, delete "limited the", insert --limited to the--.
Line 53, delete "or maybe more", insert --or may be more--.

Column 6
Line 24, delete "offers indentifying an", insert --offers identifying an--.

Column 7
Claim 12, line 4, delete "located upon the", insert --located using the--.

Signed and Sealed this

Twenty-fifth Day of December, 2007

JON W. DUDAS
*Director of the United States Patent and Trademark Office*

US007043450C1

(12) INTER PARTES REEXAMINATION CERTIFICATE (1222nd)
United States Patent
Vélez et al.

(10) Number: US 7,043,450 C1
(45) Certificate Issued: Jan. 13, 2016

(54) PAID SEARCH ENGINE BID MANAGEMENT

(75) Inventors: Juan C. Vélez, Los Angeles, CA (US); Daren Murrer, Hamilton, OH (US)

(73) Assignee: PAID SEARCH ENGINE TOOLS, LLC, Loveland, OH (US)

Reexamination Request:
No. 95/001,221, Aug. 12, 2009
No. 95/001,308, Feb. 2, 2010

Reexamination Certificate for:
Patent No.: 7,043,450
Issued: May 9, 2006
Appl. No.: 10/324,802
Filed: Dec. 20, 2002

Certificate of Correction issued Dec. 25, 2007

Related U.S. Application Data

(63) Continuation of application No. PCT/US01/41263, filed on Jul. 5, 2001.

(60) Provisional application No. 60/215,976, filed on Jul. 5, 2000.

(51) Int. Cl.
G06Q 40/00 (2012.01)
G06Q 30/02 (2012.01)
G06Q 30/08 (2012.01)
G06Q 40/04 (2012.01)

(52) U.S. Cl.
CPC ............ *G06Q 30/02* (2013.01); *G06Q 30/0241* (2013.01); *G06Q 30/0249* (2013.01); *G06Q 30/0252* (2013.01); *G06Q 30/0275* (2013.01); *G06Q 30/0283* (2013.01); *G06Q 30/08* (2013.01); *G06Q 40/04* (2013.01); *Y10S 707/99932* (2013.01)

(58) Field of Classification Search
None
See application file for complete search history.

(56) References Cited

To view the complete listing of prior art documents cited during the proceedings for Reexamination Control Numbers 95/001,221 and 95/001,308, please refer to the USPTO's public Patent Application Information Retrieval (PAIR) system under the Display References tab.

*Primary Examiner* — Christopher E Lee

(57) ABSTRACT

A method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-22 are cancelled.

\* \* \* \* \*